United States Patent
Kondo et al.

(10) Patent No.: US 6,519,368 B1
(45) Date of Patent: Feb. 11, 2003

(54) RESOLUTION ENHANCEMENT BY NEAREST NEIGHBOR CLASSIFIED FILTERING

(75) Inventors: Tetsujiro Kondo, Kanagawa-Prefecture (JP); Yasuhiro Fujimori, Cupertino, CA (US); James J. Carrig, San Jose, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 5 days.

(21) Appl. No.: 09/724,808

(22) Filed: Nov. 28, 2000

(51) Int. Cl.⁷ .................................................. G06K 9/40
(52) U.S. Cl. .................... 382/260; 382/261; 382/299
(58) Field of Search ......................... 382/260, 254, 382/261, 276, 299, 300

(56) References Cited

U.S. PATENT DOCUMENTS 5,060,277 A * 10/1991 Bokser ........................ 382/160
5,852,470 A * 12/1998 Kondo et al. ................ 382/300

* cited by examiner

Primary Examiner—Thomas D. Lee
(74) Attorney, Agent, or Firm—Blakely Sokoloff Taylor & Zafman LLP

(57) ABSTRACT

A method and apparatus for enhancing image resolution by determining a nearest neighbor class for an input image vector from a plurality of spatial classes are disclosed. In one embodiment, the nearest neighbor class is determined by first receiving the input image vector that is to be classified into one of several spatial classes. Each spatial class has a corresponding normalized mean class vector. The input image vector is normalized. Then, the weighted distances from the normalized image vector to each normalized mean class vector are determined. The class vector which is the nearest neighbor class to the input image vector is determined based on the weighted distances. A filter corresponding to the nearest neighbor class is applied to the input image vector to enhance the resolution of the image.

18 Claims, 4 Drawing Sheets

RESOLUTION ENHANCEMENT BY NEAREST NEIGHBOR CLASSIFIED FILTERING

FIELD OF INVENTION

The invention is related to the field of image processing.

BACKGROUND OF THE INVENTION

The use of spatial classes has been shown to improve the results of spatial filtering. One technique is to threshold each pixel in the class tap to form a corresponding binary value. The binary values are then used to select the spatial class. However, this technique does not scale to a large number of classes, because the number of spatial classes increases exponentially with the size of the classification tap. For example, a diamond tap classifier with radius 1, has 5 taps providing $2^5=32$ spatial classes. A diamond tap with radius 2, has 13 taps providing $2^{13}=8192$ classes. Larger taps require millions of classes.

A second limitation with the binary-threshold classification is that it is sensitive to errors and changes in a single pixel. This sensitivity adds some randomness to the classification, driving the classes more towards mono-class behavior than they would otherwise have. While this provides smooth class transitions, it limits performance.

SUMMARY OF THE INVENTION

A method and apparatus for enhancing image resolution by determining a nearest neighbor class for an input image vector from a plurality of spatial classes are disclosed. In one embodiment, the nearest neighbor class is determined by first receiving the input image vector that is to be classified into one of several spatial classes. Each spatial class has a corresponding normalized mean class vector. The input image vector is normalized. Then, the weighted distances from the normalized image vector to each normalized mean class vector are determined. The class vector which is the nearest neighbor class to the input image vector is determined based on the weighted distances. A filter corresponding to the nearest neighbor class is applied to the input image vector to enhance the resolution of the image.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for enhancing image resolution by determining a nearest neighbor class for an input image vector from a plurality of spatial classes are disclosed. In one embodiment, the nearest neighbor class is determined by first receiving the input image vector that is to be classified into one of several spatial classes. Each spatial class has a corresponding normalized mean class vector. The input image vector is normalized. Then, the weighted distances from the normalized image vector to each normalized mean class vector are determined. The class vector which is the nearest neighbor class to the input image vector is determined based on the weighted distances. A filter corresponding to the nearest neighbor class is applied to the input image vector to enhance the resolution of the image.

Figure 1:
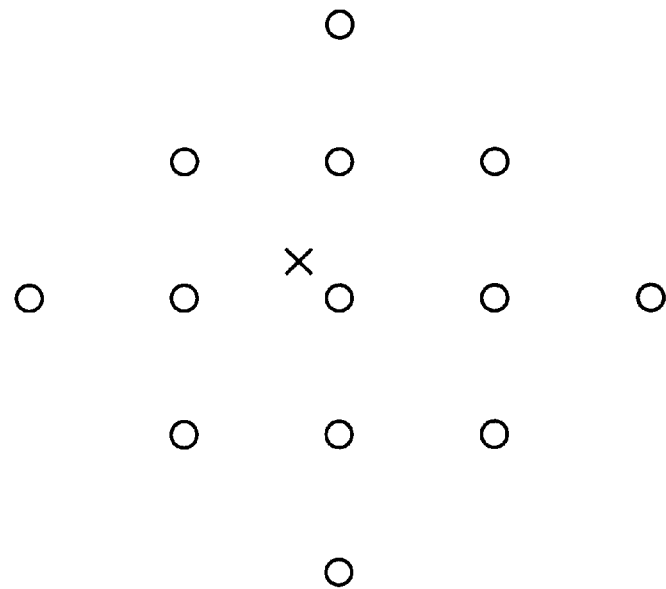
FIG. 1 shows an embodiment of a spatial filter that is used to estimate a sample value.
Figure 2:
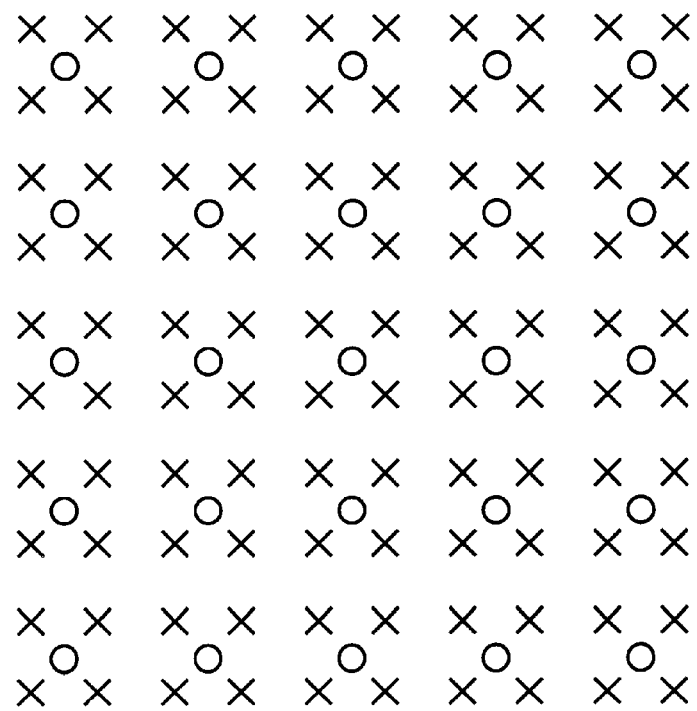
FIG. 2 shows an example of an enhanced resolution image generated from a lower resolution image.

Spatial filtering has many uses in signal processing. For example, given the set of pixels indicated as circles in FIG. 1, the value of a sample from the location marked with a cross can be estimated. A series of similar estimations could be used to generate an enhanced resolution image, as shown in FIG. 2.

Figure 3:
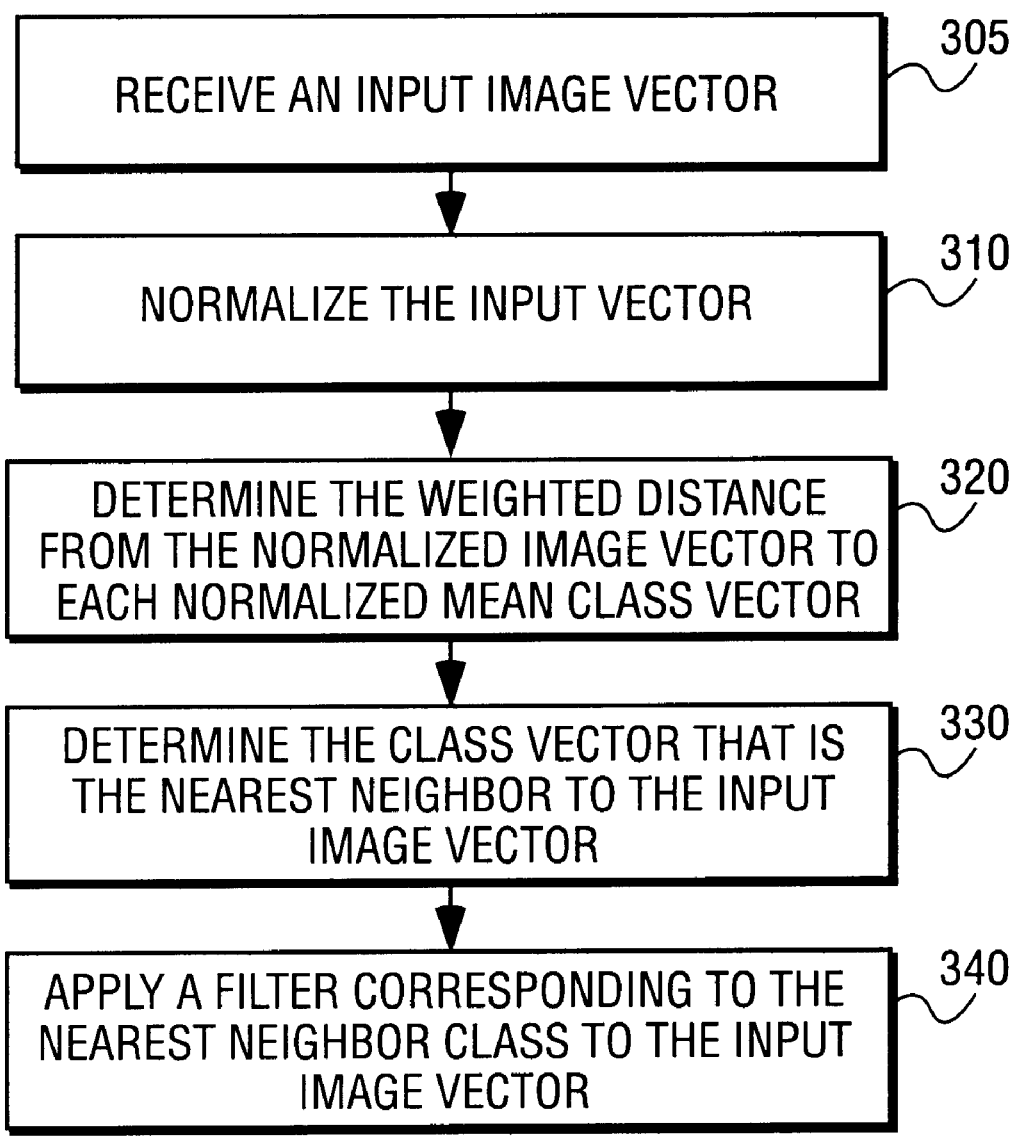
FIG. 3 shows an embodiment of a method to perform resolution enhancement nearest neighbor classified filtering.

After the spatial classes are generated, class vectors can be generated and used to improve the image resolution using nearest neighbor classified filtering. A method for nearest neighbor classified filtering is shown in FIG. 3.

The nearest neighbor class for each input image vector can be determined using the normalized mean class vector of each class and a distance measure to determine the relative distance from the input image vector to each normalized mean class vector. As shown in FIG. 3, an input image vector is received, 305. The input image vector is normalized, 310, so that pixels near the center of the tap are most highly weighted as these are clearly the most correlated with the final output. The weighted distance from the normalized image vector to each class vector is determined, 320. The class vector that is the nearest neighbor to the input image vector is determined, 330. A filter corresponding to the nearest neighbor class is applied to the input image vector, 340, to enhance the resolution of the image.

For example, nearest neighbor classification can be used to classify input image data, as shown in Table 3 below, into one of two classes. The normalized mean class vectors for the two classes are shown in Tables 1 and 2 below.

The normalized mean class vectors are used so that taps near the center of the filter are near the 0 level. This may not be achieved perfectly and so the center tap may have a slight offset from 0. This offset provides a means of class reduction, because classes can be inverted as necessary such that the center tap is always non-negative. Furthermore, classes with very small dynamic ranges are not fully expanded, so that quantization noise does not have as much weight as real edges in the training process.

Table 1 shows an example of a normalized mean class vector for a first class, class 1.

TABLE 1

|          |          | 0.17622 |         |         |
|----------|----------|---------|---------|---------|
|          | −2.73143 | 0.44055 | 0.17622 |         |
| −1.67411 | −0.88111 | 0.35244 | 0.26433 | 0.26433 |
|          | 0.00000  | 0.61678 | 0.52866 |         |
|          |          | 0.35244 |         |         |

Table 2 shows an example of a normalized mean class vector for a second class, class 2.

TABLE 2

|          | −0.82990 |          |
|----------|----------|----------|
| −0.41495 | −1.65981 | −1.65981 |

TABLE 2-continued

| 1.24486 | 0.82990 | 0.41495 | −0.82990 | 0.82990 |
|---|---|---|---|---|
|  | 0.41495 | −0.41495 | 1.24486 |  |
|  |  | 0.00000 |  |  |

Table 3 shows an input image vector to be classified into either class 1 or class 2 using nearest neighbor classification.

TABLE 3

|  |  | 104 |  |  |
|---|---|---|---|---|
|  | 106 | 97 | 96 |  |
| 64 | 78 | 94 | 92 | 101 |
|  | 118 | 137 | 141 |  |
|  |  | 122 |  |  |

The input image vector is normalized by subtracting the weighted mean from each element, and dividing by the standard deviation. The weighted mean of the input image vector is determined by multiplying each element of the input image vector by a corresponding distance weight, such as the weights shown in Table 4 below. Then, the weighted elements are added to form the weighted mean. Each element of the input image vector is multiplied by a corresponding distance weight, so that pixels near the center of the tap are most highly weighted as these are clearly the most correlated with the final output. The influence a tap has on the classification should drop off as the distance to the estimation coordinate is increased.

One method of determining a set of distance weights is to initialize each weight to the reciprocal of the Euclidean distance from the tap to the estimation coordinate and then normalize the weights such that they sum to 1. For example, the tap weights shown in Table 4 resulted for the output position (i−0.25, j−0.25).

TABLE 4

|  | j − 2 | j − 1 | j | j + 1 | j + 2 |
|---|---|---|---|---|---|
| i − 2 |  |  | 0.048 |  |  |
| i − 1 |  | 0.080 | 0.107 | 0.058 |  |
| i | 0.048 | 0.107 | 0.239 | 0.066 | 0.037 |
| i + 1 |  | 0.058 | 0.066 | 0.048 |  |
| i + 2 |  |  | 0.037 |  |  |

Table 4 shows the distance weights that are applied to the image vector. The weighted mean for the image vector is determined by multiplying each element of the image vector by its corresponding distance weight, and adding the weighted elements together. The weighted mean value is then subtracted from each element of the image vector to generate a near zero weighted mean image vector, such that weighted mean=round (140*0.048+. . . +122*0.037)=102. Table 5 shows the near zero weighted mean vector.

TABLE 5

|  |  | 38 |  |  |
|---|---|---|---|---|
|  | 4 | −5 | −6 |  |
| −38 | −24 | −8 | −10 | −1 |
|  | 16 | 35 | 39 |  |
|  |  | 20 |  |  |

The standard deviation of the near zero weighted mean image vector is determined. The near zero weighted mean image vector is normalized by dividing each vector element by the standard deviation, which is 23.859 in this example. If the center tap is negative, the vector is multiplied by −1 so that the center tap is non-negative. The result is the normalized image vector, as shown in Table 6.

TABLE 6

|  |  | −1.59264 |  |  |
|---|---|---|---|---|
|  | −0.167651 | 0.209564 | 0.251476 |  |
| 1.592684 | 1.005906 | 0.335302 | 0.419127 | 0.041913 |
|  | −0.670604 | −1.466946 | −1.634597 |  |
|  |  | −0.838255 |  |  |

Next, the weighted distance from the normalized input image vector to each normalized mean class vector is determined. The weighted distance from the normalized image vector to class 1 is determined. The weighted distance may be determined by subtracting each element of class 1 from the corresponding element of the image vector, squaring the result, multiplying the squared result by the corresponding distance weight, and adding the weighted squared results.

In this example, the weighted distance between the input image data and class 1 is $\{(-1.592684-0.17622)^2*0.048+ \ldots +(-0.838255-0.35244)^2*0.037\}=1.1151$. Similarly, the weighted distance between the normalized image vector and class 2 is determined. In this example, the distance is $\{(-1.592684--0.82990)^2*0.048+ \ldots +(-0.838255-0.00000)^2*0.0371\}=1.8406$.

The class having the smallest weighted distance from the normalized image vector is the nearest neighbor class for the image vector, which is class 1 in this example. The input image vector is added to the class which it is closest to. The vector mean of that class is updated by adding in the contribution of the current vector. After several iterations, the procedure is stopped and a filter is determined for each class via a least squares training procedure described below.

Although the above example illustrates an input image vector that is classified into one of two classes using nearest neighbor classification, the number of classes may be any number greater than two. Also, although the above example shows one input image vector, the number of input image vectors classified using this method may be any number greater than one.

Figure 4:
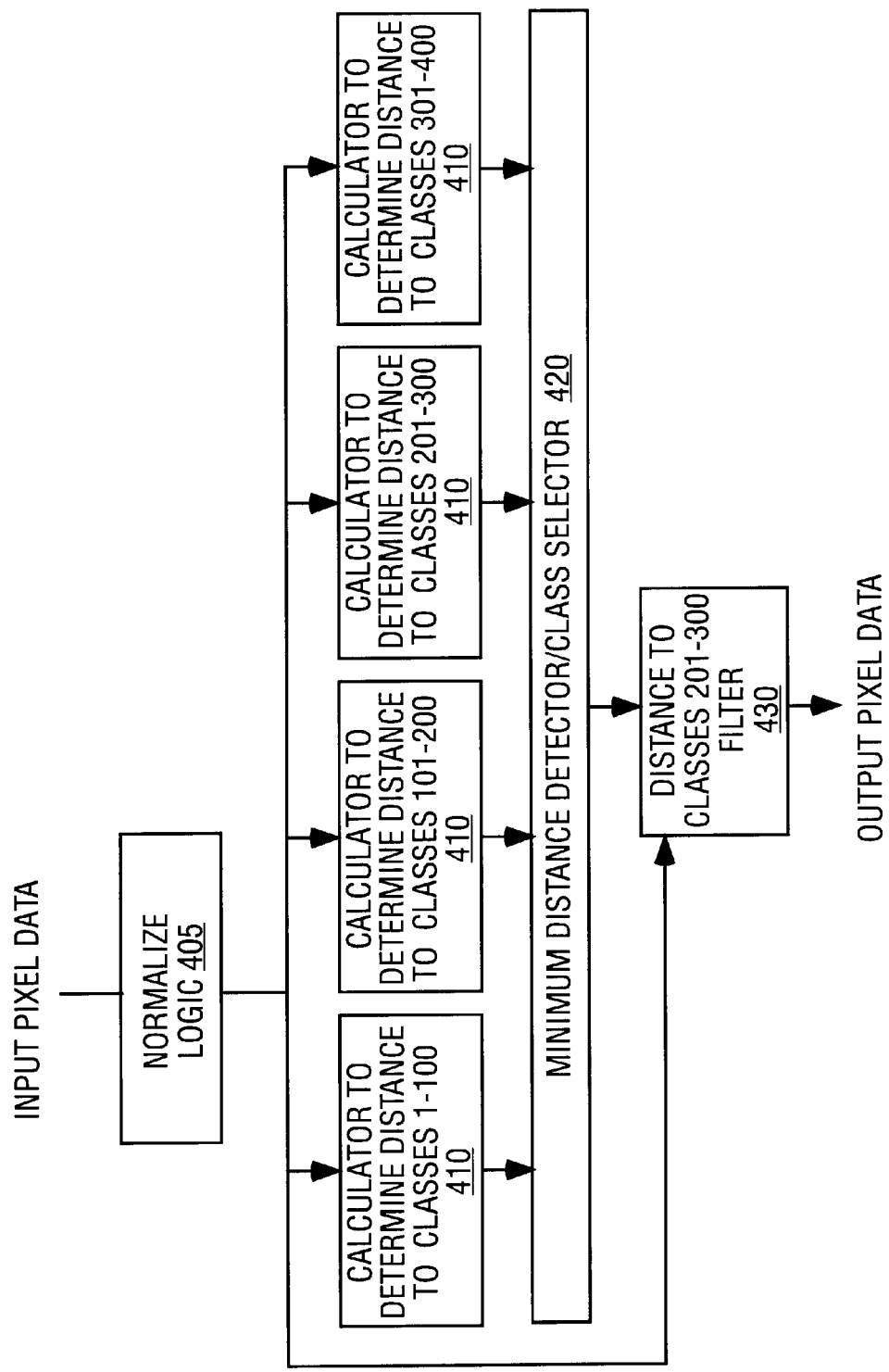
FIG. 4 shows an embodiment of a device to perform resolution enhancement nearest neighbor classified filtering.

FIG. 4 shows an embodiment of a device 400 to perform nearest neighbor classified filtering for resolution embodiment. Input data for an image is received by normalize logic 405, which normalizes the input image vector data. The normalized image vector is input to distance calculators 410. The distance calculators determine the distance from the input image to each of the spatial classes. The distances are received from the calculators 410 by minimum distance detector 420. The detector 420 determines which class is the closest to the input image data. The closest class is selected as the nearest neighbor class. The image data can then be applied to filter 630 to enhance resolution. The pixel data that is output by the filter may be displayed by a display device, such as a television monitor for example.

The device 400 shown in FIG. 4 may be implemented as hardware circuitry, software stored in a computer readable medium and executed by a computer processor, or a combination of hardware and software.

Resolution enhancement by nearest neighbor filtering can be applied to any form of temporally correlated data, including without limitation, video or other two-dimensional moving images, and three-dimensional moving images, and audio such as stereo. In the description, the term value, in one embodiment, may refer to a component within a set of received or generated data. Furthermore, a data point may be a position, place, instance, location or range within data.

For the sake of clarity, some of the description herein focuses on video data comprising a pixel stream. However, it will be recognized that resolution enhancement by nearest neighbor filtering may be performed with other types of data other than video data and that the terms and phrases used herein to describe resolution enhancement by nearest neighbor filtering cover a broad range of applications and data types. For example, an adaptive filter tap structure is an adaptive structure for filter tap definition based upon a corresponding class.

A class may be defined based on one or more characteristics of the target data. For example, a class may also be defined based on one or more characteristics of the group containing the target data. A class ID is a specific value within the class that is used to describe and differentiate the target data from other data with respect to a particular characteristic. A class ID may be represented by a number, a symbol, or a code within a defined range. A parameter may be used as a predetermined or variable quantity that is used in evaluating, estimating, or classifying the data.

Resolution enhancement by nearest neighbor filtering provides a method and apparatus for adaptive processing that generates data corresponding to a set of one or more data classes. This process is known as "class definition." Class definition can be achieved by various attributes of signal distribution using conventional methods described by Richard O. Duda and Peter E. Hart in *Pattern Classification and Scene Analysis*, John Wiley & Sons, June 1973, for example.

For each class, a suitable filter for signal restoration is prepared for the adaptive processing. In one embodiment, each filter may be represented by a matrix of filter coefficients which are applied to the data. The filter coefficients can be generated by a training process, an example of which is described subsequently, that occurs as a preparation process prior to filtering.

Output data is generated according to the linear combination operation given by [formula 1], shown below, $$y = \sum_{i=1}^{N} w_i \cdot x_i \qquad \text{[formula 1]}$$

where $x_i$ is input data, $w_i$ corresponds to each filter coefficient, N is the number of coefficients, and y is the output data after error recovery. Filter coefficients can be generated for each class ID by a training process that occurs prior to the resolution enhancement process.

Filter coefficients can be generated by a training process. For example, training may be achieved according to the following criterion:

$$\min_{W} \|X \cdot W - Y\|_2 \qquad \text{[formula 2]}$$

where X, W, and Y are, for example, the following matrices: X is the input data matrix defined by [formula 3], W is the coefficient matrix defined by [formula 4], and Y corresponds to the target data matrix defined by [formula 5].

$$X = \begin{pmatrix} x_{11} & x_{12} & \cdots & x_{1n} \\ x_{21} & x_{22} & \cdots & x_{2n} \\ \vdots & \vdots & \ddots & \vdots \\ x_{m1} & x_{m2} & \cdots & x_{mn} \end{pmatrix} \qquad \text{[formula 3]}$$

$$W = \begin{pmatrix} w_1 \\ w_2 \\ \vdots \\ w_n \end{pmatrix} \qquad \text{[formula 4]}$$

$$Y = \begin{pmatrix} y_1 \\ y_2 \\ \vdots \\ y_m \end{pmatrix} \qquad \text{[formula 5]}$$

The coefficient $w_i$ can be obtained according to [formula 2], so that estimation errors against target data are minimized.

Figure 5:
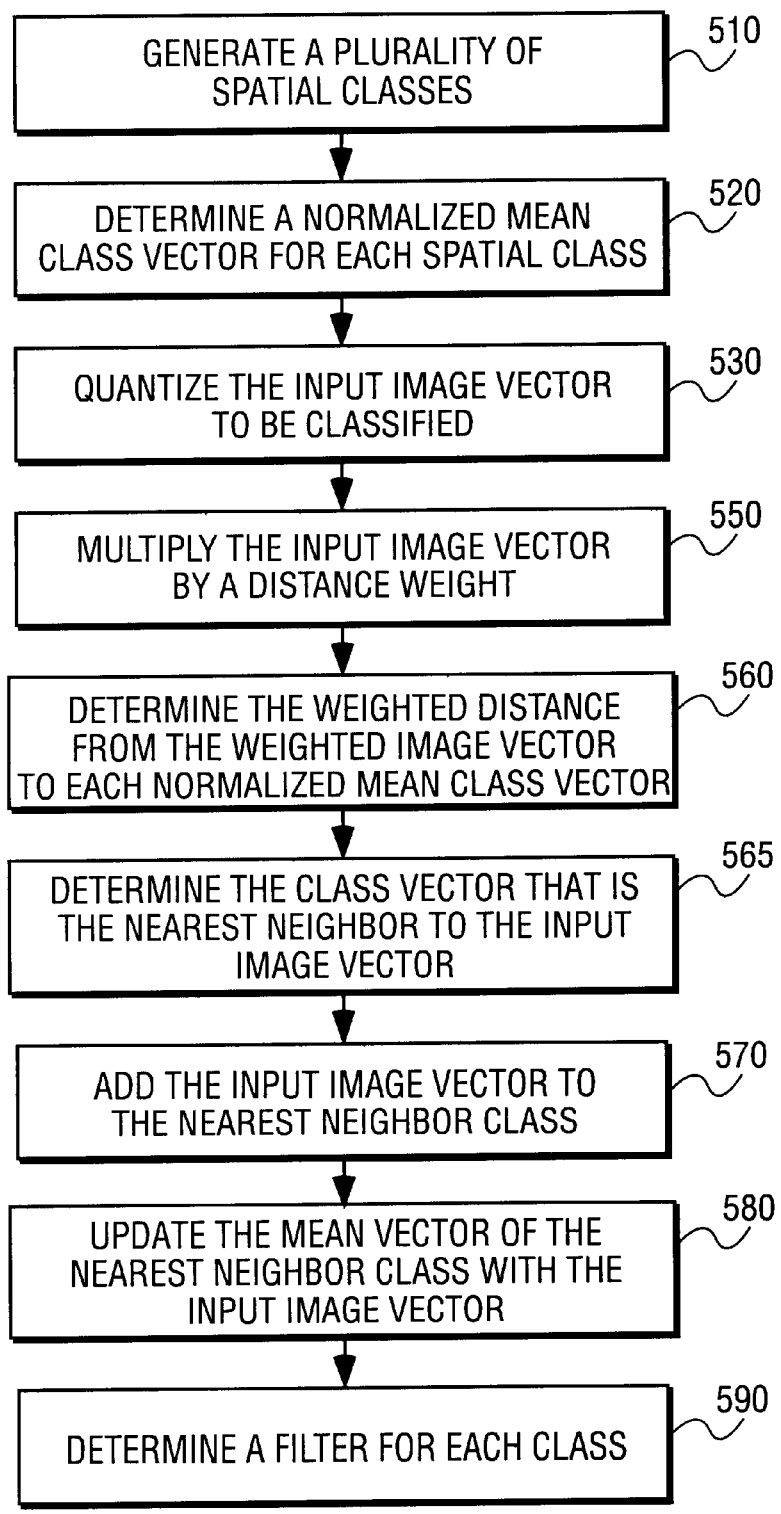
FIG. 5 shows an alternate embodiment of a method to perform resolution enhancement nearest neighbor classified filtering.

An alternate embodiment is shown in FIG. 5. At step 510 a plurality of spatial classes are generated. A normalized mean class vector for each spatial class is determined, 520. The input image vector classified is quantized, 530. The input image vector is multiplied by a distance weight, 550. The weighted distance from the weighted image vector to each normalized mean class vector is determined, 560. The class vector that is the nearest neighbor to the input image vector is determined, 565. The input image vector to the nearest neighbor class is added, 570. The mean vector of the nearest neighbor class with the input image vector is updated, 580. A filter for each class is determined, 590.

Thus, a method for resolution enhancement by nearest neighbor classified filtering is disclosed. These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method comprising:
    enhancing image resolution by determining a nearest neighbor class for an input image vector from a plurality of spatial classes based on weighted distances from a normalized image vector to each of a plurality of normalized mean class vectors, wherein the normalized image vector corresponds to the input image vector and each normalized mean class vector corresponds to one of the plurality of spatial classes; and
    applying a filter corresponding to the nearest neighbor class to the input image vector.

2. The method of claim 1 wherein determining the nearest neighbor class further comprises:
    receiving the input image vector to be classified, and receiving the plurality of normalized mean class vectors;
    normalizing the image vector; and
    determining the weighted distances from the normalized image vector to each normalized mean class vector.

3. The method of claim 2 wherein normalizing the input image vector further comprises:
    determining a weighted mean for the input image vector.

4. The method of claim 3 wherein normalizing the input image vector further comprises:

determining a standard deviation for the input image vector.

5. An apparatus comprising:

means for enhancing image resolution, including means for determining a nearest neighbor class for an input image vector from a plurality of spatial classes based on weighted distances from a normalized image vector to each of a plurality of normalized mean class vectors, wherein the normalized image vector corresponds to the input image vector and each normalized mean class vector corresponds to one of the plurality of spatial classes; and means for applying a filter corresponding to the nearest neighbor class to the input image vector.

6. The apparatus of claim 5 wherein said means for determining the nearest neighbor class further comprises:

means for receiving the input image vector to be classified, and for receiving the plurality of normalized mean class vectors;

means for normalizing the image vector; and means for determining the weighted distances from the normalized image vector to each normalized mean class vector.

7. The apparatus of claim 6 wherein said means for normalizing the input image vector further comprises:

means for determining a weighted mean for the input image vector.

8. The apparatus of claim 7 wherein said means for normalizing the input image vector further comprises:

means for determining a standard deviation for the input image vector.

9. A computer readable medium having instructions which, when executed by a processing system, cause the system to:

enhance image resolution by determining a nearest neighbor class for an input image vector from a plurality of spatial classes based on weighted distances from a normalized image vector to each of a plurality of normalized mean class vectors, wherein the normalized image vector corresponds to the input image vector and each normalized mean class vector corresponds to one of the plurality of spatial classes; and apply a filter corresponding to the nearest neighbor class to the input image vector.

10. The medium of claim 9 wherein determining the nearest neighbor class further comprises:

receiving the input image vector to be classified, and receiving the plurality of normalized mean class vectors;

normalizing the image vector; and determining the weighted distances from the normalized image vector to each normalized mean class vector.

11. The medium of claim 10 wherein normalizing the input image vector further comprises:

determining a weighted mean for the input image vector.

12. The medium of claim 11 wherein normalizing the input image vector further comprises:

determining a standard deviation for the input image vector.

13. A method comprising:

normalizing each of a plurality of target image vectors;

calculating weighted distances from each normalized target image vector to each of a plurality of normalized mean class vectors, each normalized mean class vector corresponding to one of a plurality of spatial classes;

selecting a nearest neighbor class for each of the target image vectors based on the weighted distances;

adding each target image vector to the corresponding nearest neighbor class;

updating the normalized mean class vector of each nearest neighbor class with the corresponding normalized target image vector; and determining a filter for each of the spatial classes.

14. The method of claim 13, wherein determining a filter comprises:

generating filter coefficients.

15. An apparatus comprising:

means for normalizing each of a plurality of target image vectors;

means for calculating weighted distances from each normalized target image vector to each of a plurality of normalized mean class vectors, each normalized mean class vector corresponding to one of a plurality of spatial classes;

means for selecting a nearest neighbor class for each of the target image vectors based on the weighted distances;

means for adding each target image vector to the corresponding nearest neighbor class;

means for updating the normalized mean class vector of each nearest neighbor class with the corresponding normalized target image vector; and means for determining a filter for each of the spatial classes.

16. The apparatus of claim 15, wherein the means for determining comprises:

means for generating filter coefficients.

17. A computer readable medium having instructions which, when executed by a processing system, cause the system to:

normalize each of a plurality of target image vectors;

calculate weighted distances from each normalized target image vector to each of a plurality of normalized mean class vectors, each normalized mean class vector corresponding to one of a plurality of spatial classes;

select a nearest neighbor class for each of the target image vectors based on the weighted distances;

add each target image vector to the corresponding nearest neighbor class;

update the normalized mean class vector of each nearest neighbor class with the corresponding normalized target image vector; and determine a filter for each of the spatial classes.

18. The medium of claim 17, wherein the instructions further cause the processing system to generate filter coefficients when determining a filter.

* * * * *